Figure 1:
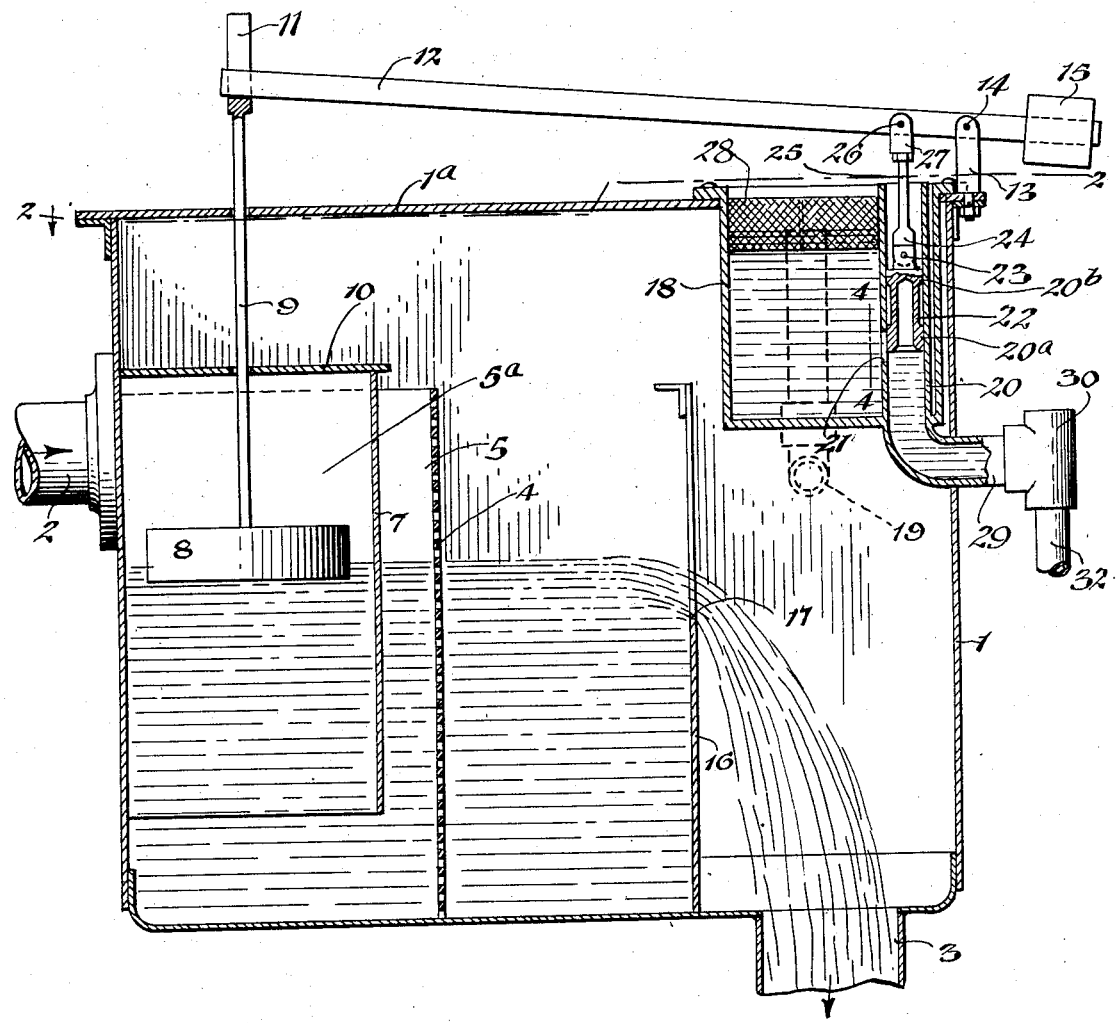

April 16, 1935.  W. McN. HUTCHINSON  1,997,970
PROPORTIONATE FEEDER
Filed Sept. 17, 1929   2 Sheets-Sheet 1

Inventor
William McNeill Hutchinson
by
Attorney

April 16, 1935.  W. McN. HUTCHINSON  1,997,970
PROPORTIONATE FEEDER
Filed Sept. 17, 1929   2 Sheets-Sheet 2
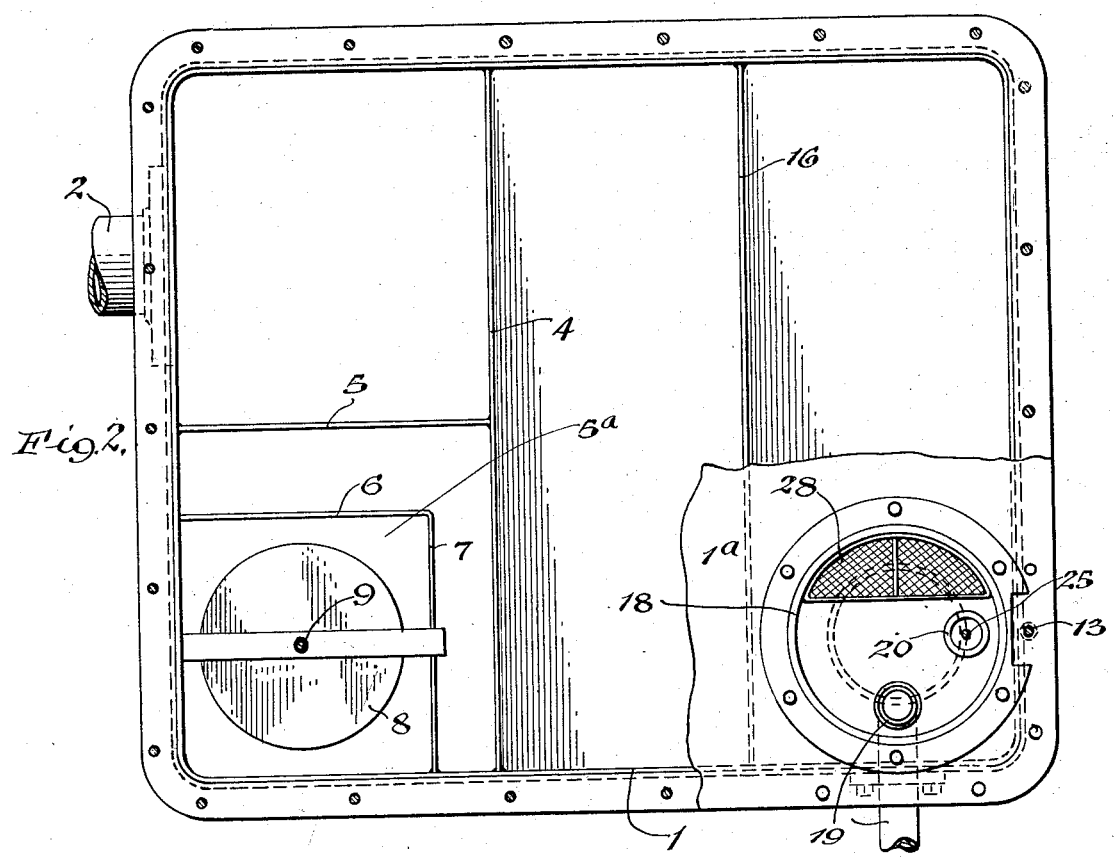
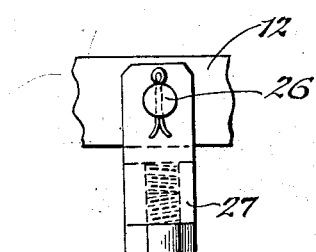
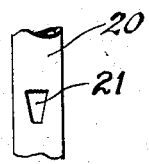
Inventor
William McNeill Hutchinson
by Forbes Silsby
Attorney Patented Apr. 16, 1935

1,997,970

UNITED STATES PATENT OFFICE 1,997,970

PROPORTIONATE FEEDER

William McNeill Hutchinson, Buffalo, N. Y., assignor to National Aniline & Chemical Company, Inc., New York, N. Y., a corporation of New York Application September 17, 1929, Serial No. 393,225

9 Claims. (Cl. 210—21)

The present invention relates to an apparatus for proportioning liquids in a fixed ratio, and is of particular utility in the treatment or purification of water on a large scale.

In the softening of water for use in boilers, it is desirable that the proportion of raw water to chemical mixed therewith be maintained constant. Apparatus designed for the continuous treatment of water usually comprise an arrangement whereby the quantity of chemical introduced into the water is automatically varied in proportion to the rate of flow of the water into the settling tank, thereby maintaining a constant ratio of chemical to raw water.

One object of the present invention is the provision of an apparatus of the character specified which is simple in construction and automatic and accurate in operation and is practically trouble free.

Another object is the provision of a gate valve which shall automatically adjust itself to permit the required volume of liquid to flow therethrough.

These and other objects which will appear hereinafter are accomplished, according to the present invention, by an apparatus which comprises a tank, means for continuously introducing liquid into the tank, a stilling plate disposed in the tank to subdue the surge of incoming liquid, means for maintaining a minimum level of liquid in the tank, a vertically movable body in the tank adapted to move in accordance with changes in the level of liquid in the tank, a chemical box having a gate therein, and means connecting the body with the gate to regulate the discharge of liquid through the gate as the liquid level in the tank changes.

The invention accordingly comprises the herein described apparatus embodying features of construction, combination of elements and arrangement of parts which are adapted to effect the objects, all as exemplified in the following detailed disclosure, and the scope of the application of which will be indicated in the claims.

Figure 1 is a sectional view of one modification of the invention; Figure 2 is a sectional view along the line 2—2 of Figure 1; Figure 3 is a detail view of the valve plug; and Figure 4 shows the orifice in the valve.

Referring to the drawings, the numeral 1 indicates a tank made of sheet iron, iron plate or other suitable material and having a cover 1a. An inlet 2 for the boiler feed water and an outlet 3 which leads to the mixing vat or settling tank (not shown) are provided in the tank. A perforate baffle or stilling plate 4, at a point about one-third of the width of the tank, divides the tank into two compartments and extends vertically above the maximum water level in the tank. An imperforate baffle or deflector 5 of about equal height and extending at right angles to the stilling plate 4, divides the smaller compartment into two equal compartments. Within one of the compartments thus formed is the float chamber 5a formed on two sides by the walls of the tank and completed on its other two sides by the imperforate walls, 6, 7, which extend downwardly to a point near the bottom of the tank. It is apparent that, in the foregoing construction, water entering the tank through the inlet 2 must pass through the stilling plate 4 and back again in order to enter the float chamber 5a.

Within the float chamber 5a is a float 8 which is shown as a closed cylinder, but which may be of any suitable construction. A float rod 9 is secured to the float and extends upward through the brace 10 in which it is loosely journaled. The upper end of the float rod is splined, as indicated by the numeral 11. The lever 12 at one end rests loosely in the prongs of the splined float rod 11, and near its other end is pivoted in the fulcrum 13 by means of the pivot pin 14. The lever 12 may carry a counter weight 15 to counterbalance the weight of the lever and movable parts suspended therefrom.

Longitudinally and equally dividing the larger compartment in the tank is the partition 16 having the sharp-edge weir 17 formed therein. The weir is shown as being rectangular, but it may be of any other suitable form. The level of water in the float compartment will be governed by the difference between the rate at which water enters the tank through inlet 2 and the rate at which water flows over the weir. As the water level in the float compartment rises or falls, it will cause a corresponding movement of the float 8 which will be imparted to the end of the lever 12, through the float rod 9.

Intermediate between the pivot 14 and the floating end of the level is pivoted the valve rod 25, the function of which will be presently explained. Situated at one corner of the tank 1 is the chemical tank or box 18, which may be cylindrical as shown or of any other form. The chemical is introduced into the box 18 by a pipe (not shown), passing first through the screen 28. The overflow of the chemical box is carried away through the overflow pipe 19. This arrangement provides a constant static head of liquid in the chemical box. Rising from the bottom of the chemical box is the outlet pipe 20 having therein an orifice 21 which lies below the liquid level in the box. A piston 22 slidably operates in the pipe 20 across the orifice to vary its effective area. The piston is of slightly increased diameter at its ends 20a and 20b to provide bearing surfaces. The slide valve or plunger 22 is secured to the lever 12 by the connecting rod 25 pivotally secured at its lower end 24 by the pin 23 and at its upper end to the lever 12 by the pin 26.

In operation, water enters the tank through the inlet 2 and passing through the perforate stilling plate 4 and back again, enters the float chamber 5a where it acts on the float 8. As the level in the well rises the float rises until a level is reached at which water begins to flow over the weir 17. The level of the liquid will now rise further only when the water enters the tank faster than it can be discharged over the weir. Variations in the water level therefore are governed by the difference between rate at which water enters the tank and the rate at which it flows over the weir, and cause a corresponding rise or fall of the float 8 which is imparted to the lever 12 through float rod 9. A proportional movement is imparted through the connecting rod 25 pivoted to the lever 12 to the valve piston 22 which slides over the orifice 21, the effective area of which is thereby varied in proportion. The trapezoidal orifice 21, as shown in Figure 4, is of proper size to deliver the required amount of chemical under conditions of maximum flow over the weir. The form of the orifice is such that its area is restricted by movement of the valve plug in lineal relation to the differential level of water in the tank. The liquid which enters the tube 20 passes through the elbow 29 and pipe 32 to the mixing tank or vat where it mingles with the raw water from outlet 3. An inspection opening is provided in the top of the T-fitting 30 to permit observation of the flow.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In an apparatus of the character described, the combination comprising a tank, a float chamber therein, means for introducing liquid into the float chamber from the tank, a vertically movable body in the float chamber adapted to be raised or lowered according to changes in the level of liquid in the float chamber, a second tank to contain liquid and having a discharge pipe in which is a tapered orifice, means for maintaining a substantially constant head of liquid in said second tank, a piston movable in the pipe adapted to vary by its movement the effective area of the orifice, and means connecting said body with said piston to regulate the discharge of liquid through the orifice as the liquid level in the float chamber changes.

2. In an apparatus of the character described, the combination comprising a tank having a liquid inlet and a float chamber, means for continuously introducing liquid into the tank and float chamber, a stilling plate in the tank disposed between the tank inlet and the float chamber to subdue the surge of incoming liquid, means for maintaining a minimum level of liquid in the float chamber, a vertically movable body in the float chamber adapted to be raised or lowered in accordance with changes in the level of liquid in the float chamber, a second tank to contain liquid and having a discharge pipe in which is a tapered orifice, means for maintaining a substantially constant head of liquid in said second tank, a piston movable in said pipe adapted to vary the effective area of the orifice by its movement, and means connecting said body with said piston to regulate the discharge of liquid through said orifice as the liquid level in the float chamber changes.

3. In an apparatus for proportioning flow of liquids, in combination, a tank comprising a float chamber, a float in said chamber, an inlet to said tank separated from the float chamber by a solid partition extending to the bottom of the tank, a baffling member located at right angles to said partition and comprising a perforated plate extending across the inlet and the float chamber, a weir spaced from said baffling member, over which liquid from said float chamber flows and discharges into a liquid outlet, a chemical feed box in said tank positioned to discharge liquid into the stream flowing over the weir, an inlet to said feed box, means for maintaining a substantially constant head of liquid in said feed box, a discharge pipe in which is a downwardly tapered orifice through which flow from said chemical feed box occurs, a piston movable in the pipe to regulate the effective area of the orifice, means connecting said float with said piston to regulate the discharge of liquid through said orifice so that it bears a lineal relation to the flow of liquid over said weir.

4. In an apparatus of the character described, the combination comprising a tank, a float chamber therein, means for introducing liquid into the float chamber from the tank, a float in the float chamber adapted to be raised or lowered according to changes in the level of liquid in the float chamber, a second tank adapted to contain liquid and having a discharge pipe in which is a tapered orifice, means for maintaining a substantially constant head of liquid in said second tank, a piston movable in the pipe adapted to vary by its movement the effective area of the orifice, and means connecting said float with said piston to regulate the discharge of liquid through the orifice as the liquid level in the float chamber changes.

5. In an apparatus of the character described, the combination comprising a tank having a liquid inlet and a float chamber, means for introducing liquid into the tank and into the float chamber, a plurality of stilling plates in the tank disposed between the tank inlet and the float chamber to subdue the surge of incoming liquid, means for maintaining a minimum level of liquid in the float chamber, a float in the float chamber adapted to be raised or lowered in accordance with changes in the level of liquid in the float chamber, a second tank adapted to contain a liquid and having a discharge pipe which is a tapered orifice, means for maintaining a substantially constant head of liquid in said second tank, a piston movable in said pipe adapted to vary the effective area of the orifice by its movement, and means connecting said float with said piston to regulate the discharge of liquid through the said orifice as the liquid level in the float chamber changes.

6. In an apparatus of the character described, the combination comprising a tank, a float therein, said tank being adapted to contain liquid for operating the float, a second tank adapted to contain liquid and having associated therewith a discharge tube having a tapered orifice with the greater width at the top, means for maintaining a substantially constant head of liquid in said second tank, a piston slidably mounted in the tube to regulate the effective area of the orifice, a lever for slidably operating said piston, and means including the float for operating said piston to increase the area of the opening in the orifice on raising the level of the liquid in the tank.

7. In an apparatus of the character described, the combination comprising a tank having a discharge weir, a float in said tank, said tank being adapted to contain liquid for operating the float and to be discharged over said weir, a second tank adapted to contain liquid to be mixed with the liquid in the first tank and having means for maintaining a substantially constant head of liquid therein, said second tank having associated therewith a vertically disposed tapered discharge orifice wider at one end than at the other, a closure for said orifice movable from the wide end toward the narrow end to restrict the orifice and to regulate the effective area thereof, and means including the float for operating the closure to increase the effective area of the orifice opening on raising the level of the liquid in said first tank and to decrease the effective area of the opening on lowering the level of liquid in said first tank, whereby the amount of liquid discharged from the second tank is proportioned to the amount of liquid discharged over the weir of the first tank.

8. In an apparatus of the character described, the combination comprising a tank having a discharge weir, a float in said tank, said tank being adapted to contain liquid for operating the float and to be discharged over said weir, a second tank adapted to contain liquid to be mixed with the liquid in the first tank and having means for maintaining a substantially constant head of liquid therein, said second tank having associated therewith a vertically disposed tapered discharge orifice with the greater width at the top, a closure for said orifice movable from the top to the bottom of the orifice to restrict the orifice and to regulate the effective area thereof, and means including the float for operating the closure to increase the effective area of the orifice opening on raising the level of the liquid in said first tank and to decrease the effective area of the opening on lowering the level of liquid in said first tank, whereby the amount of liquid discharged from the second tank is proportioned to the amount of liquid discharged over the weir of the first tank.

9. In an apparatus of the character described the combination comprising a tank, a float therein, said tank being adapted to contain liquid for operating the float, a second tank adapted to contain liquid and having associated therewith a discharge tube having a vertically disposed tapered orifice wider at one end than at the other, means for maintaining a substantially constant head of liquid in said second tank, a piston slidably movable in the tube from the wide end of the orifice toward the narrow end to regulate the effective area of the orifice, means including the float for operating the piston to increase the effective area of the orifice opening on raising the level of the liquid in the first tank and to decrease the effective area of the orifice opening on lowering the level of liquid in the first tank.

WILLIAM McNEILL HUTCHINSON.